(12) United States Patent
Kultanen et al.

(10) Patent No.: US 10,273,120 B2
(45) Date of Patent: Apr. 30, 2019

(54) HOISTING DEVICE

(71) Applicant: Konecranes Global Corporation, Hyvinkää (FI)

(72) Inventors: Tero Kultanen, Lempäälä (FI); Jani Ala-Uotila, Tampere (FI); Pasi Nokelainen, Tampere (FI); Veli-Pekka Vuoti, Lempäälä (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 283 days.

(21) Appl. No.: 15/503,276

(22) PCT Filed: Sep. 15, 2015

(86) PCT No.: PCT/FI2015/050614
§ 371 (c)(1),
(2) Date: Feb. 10, 2017

(87) PCT Pub. No.: WO2016/042207
PCT Pub. Date: Mar. 24, 2016

(65) Prior Publication Data
US 2018/0208444 A1    Jul. 26, 2018

(30) Foreign Application Priority Data

Sep. 19, 2014    (FI) .................................... 20145822

(51) Int. Cl.
*B66C 13/14*        (2006.01)
*H02G 11/00*        (2006.01)
*B66C 19/00*        (2006.01)

(52) U.S. Cl.
CPC .............. *B66C 13/14* (2013.01); *B66C 19/00* (2013.01); *H02G 11/006* (2013.01)

(58) Field of Classification Search
CPC ........ B66C 13/14; B66C 19/00; H02G 11/006
See application file for complete search history.

(56) References Cited

U.S. PATENT DOCUMENTS

| | | | | |
|---|---|---|---|---|
| 2,292,124 | A | * | 8/1942 | Hynes ..................... B66B 7/062 |
| | | | | 174/117 M |
| 3,106,368 | A | * | 10/1963 | Tait ......................... B65H 75/38 |
| | | | | 242/375 |

(Continued)

FOREIGN PATENT DOCUMENTS

| | | |
|---|---|---|
| CN | 203377574 U | 1/2014 |
| DE | 955 334 | 1/1957 |

(Continued)

OTHER PUBLICATIONS

Extended European Search Report issued in the corresponding European Patent Application No. 15842553.8, dated Mar. 28, 2018.

*Primary Examiner* — Emmanuel M Marcelo
(74) *Attorney, Agent, or Firm* — Birch, Stewart, Kolasch & Birch, LLP

(57) ABSTRACT

A hoisting device includes a trolley travelling along a support structure, and a hoisting member to be lowered and lifted therefrom by means of hoisting ropes, as well as a current supply cable between the trolley and the hoisting member, wherein the structure of the current supply cable is made to assume a spiral shape such that in an uplifted position it forms an at least substantially flat-spiral structure wherein turns of the spiral structure lie in turns of increasing diameter.

11 Claims, 2 Drawing Sheets

(56) References Cited

U.S. PATENT DOCUMENTS

| | | | | |
|---|---|---|---|---|
| 3,260,508 | A | * | 7/1966 | Powell .................... B66D 3/18 137/355.2 |
| 3,300,154 | A | * | 1/1967 | Campbell, Jr. ......... B63B 21/04 137/355.28 |
| 3,548,272 | A | * | 12/1970 | Messmer ................ B66C 13/54 200/16 R |
| 4,076,215 | A | * | 2/1978 | Landert ................... B66F 3/242 254/93 R |
| 4,491,301 | A | * | 1/1985 | Pendola .................. B66D 1/58 212/281 |
| 5,662,311 | A | * | 9/1997 | Waedekin ............ B66C 13/105 254/270 |
| 5,915,673 | A | * | 6/1999 | Kazerooni ............... B66C 1/62 212/285 |
| 6,886,812 | B2 | * | 5/2005 | Kazerooni ........... B66C 1/0212 212/285 |
| 8,563,860 | B1 | | 10/2013 | Ramos, Jr. |
| 2010/0237305 | A1 | * | 9/2010 | Miller ...................... B66F 7/02 254/358 |

FOREIGN PATENT DOCUMENTS

| | | | | |
|---|---|---|---|---|
| DE | 955 334 | C | 1/1957 | |
| DE | 1 197 718 | | 7/1965 | |
| DE | 1 197 718 | B | 7/1965 | |
| DE | 202012003945 | U1 | 5/2012 | |
| EP | 2506378 | A1 | 10/2012 | |
| GB | 1071784 | | 6/1967 | |
| GB | 2188905 | * | 10/1987 | ............ B65H 75/36 |
| JP | 49-11277 | | 1/1974 | |
| JP | 1-83768 | U | 6/1989 | |
| JP | 2001-72378 | A | 3/2001 | |
| JP | 2005-8370 | A | 1/2005 | |
| SU | 1470651 | A1 | 4/1989 | |
| WO | WO 99/54641 | A2 | 10/1999 | |

* cited by examiner

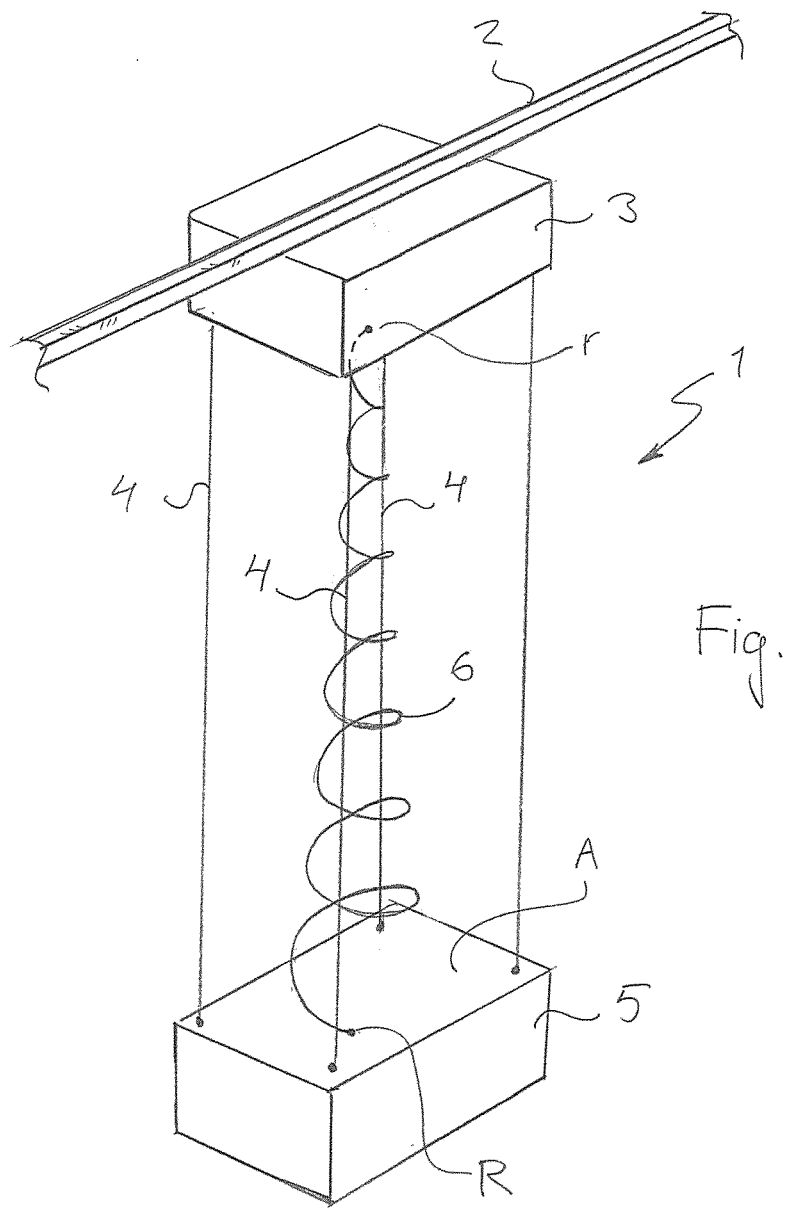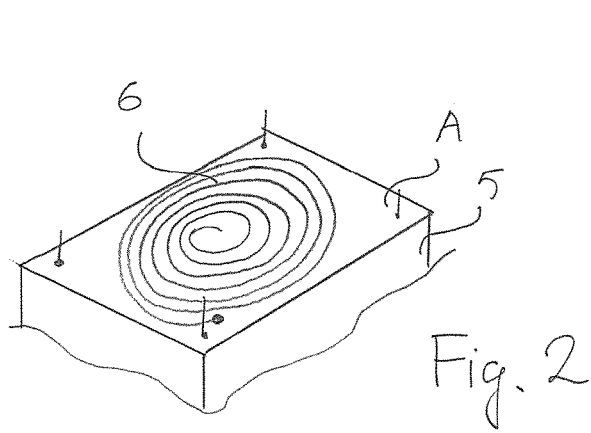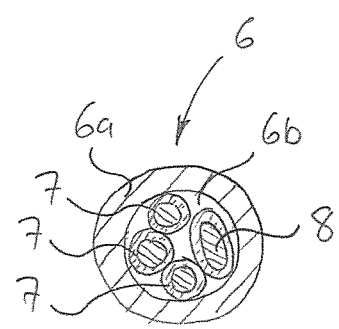

HOISTING DEVICE

BACKGROUND OF THE INVENTION

The invention relates to a hoisting device comprising a trolley travelling along a support structure, and a hoisting member to be lowered and lifted therefrom by means of hoisting ropes, as well as a current supply cable between the trolley and the hoisting member.

In prior art, energy transfer has been solved by drum-reeling chains or ladder-type collapsible structures. Twist spiral structures are also known wherein the twists of the spiral are stacked on top of one another, in to the shape of a tubular cylinder, like those of a screw thread. When the hoisting device is used for instance as a pick-up robot embodiment in an automatic warehouse, the known current supply cable structures have caused vibration of the hoisting member, which, in this use in particular where moving takes place in accurately and narrowly dimensioned aisle passages, is undesired. Further, in an upper position of the hoisting member, the drum-reeling and collapsible or superimposable structures require a considerable amount of space above the hoisting member.

SUMMARY OF THE INVENTION

An object of the invention is to eliminate the above disadvantages. This object is achieved by the solution according to the invention, which is characterized in that the structure of the current supply cable is made to assume a spiral shape such that in an uplifted position it forms an at least substantially flat-spiral structure wherein turns of the spiral structure lie in turns of increasing diameter.

The invention is thus based on using a current supply cable which in the upper position of the hoisting member settles in the shape of a flat-spiral structure.

It would be most preferable that all turns of the spiral structure were substantially in the same plane, but an incomplete flat spiral is also possible where the turns of the spiral structure lie in a plurality of planes but where the number of these planes is substantially smaller than that of said turns. The limiting and determining point herein is in how small a space it would be advantageous to place the current supply cable in a height direction.

Preferably, a frame of the current supply cable is made of a material which by means of heating is formed into a flat-spiral structure and which, after the heating, has a memory striving to return an unwound cable in to the shape of the flat-spiral structure. The frame of the current supply cable may be formed for instance from a pneumatic hose by curing it in to the shape of a flat spiral. The necessary wiring, such as electric lines, and preferably also data cable(s), is/are drawn into the frame of the current supply cable after its heating.

The solution according to the invention is less expensive, contains fewer movable parts, requires less space and causes no vibration of the hoisting member. In addition, it enables data transfer cables, which are nowadays necessary in more and more uses, to be installed in the same space as the electric lines, making them all well protected.

This new structure enables the life of the current supply cable to be enhanced so as to last even ten times longer than that in the previous solutions. It is now possible by the same cable to achieve endurance of about 400 000 liftings and lowerings. The new structure is also considerably more inexpensive to implement.

LIST OF FIGURES

The invention is now be described in closer detail by means of a preferred exemplary embodiment and with reference to the accompanying drawings, in which FIG. 1 is a simplified schematic view showing a hoisting device according to the invention;

FIG. 2 shows a current supply cable seen in FIG. 1, wound on top of a hoisting member;

FIG. 3 is a cross-sectional view showing the current supply cable according to FIGS. 1 and 2.

DETAILED DESCRIPTION OF THE INVENTION

Figure 4:
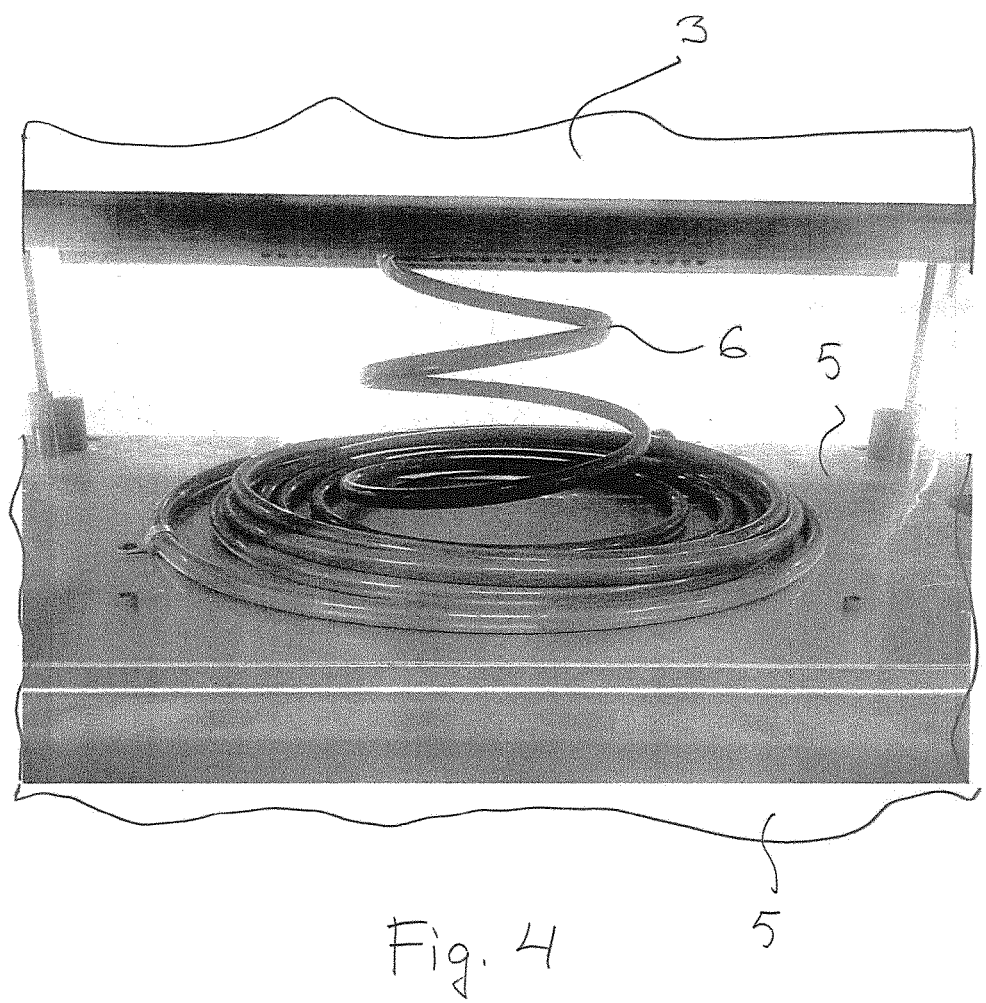
FIG. 4 shows the current supply cable wound into an incomplete flat spiral.

Referring to the drawings, a hoisting device 1 according to the invention comprises a trolley 3 travelling along a support structure 2, and a hoisting member 5 to be lowered and lifted therefrom by means of hoisting ropes 4, as well as a current supply cable 6 between the trolley 3 and the hoisting member 5.

A use of such a hoisting device 1 is as a pick-up robot in an automatic warehouse, where the structure of the current supply cable 6 according to the present invention is extremely advantageous.

The (internal) structure of the current supply cable 6 is made to assume a spiral shape such that in an uplifted position it strives to form a flat-spiral structure wherein preferably all turns of the spiral structure lie substantially in the same plane in turns of increasing diameter. This is not always possible, but the current supply cable 6 may, in accordance with FIG. 4, also wind up into an incomplete flat spiral where the turns of the spiral structure lie in a plurality of planes but where the number of these planes is considerably smaller than that of said turns.

In the example presently described, the current supply cable 6 assuming a spiral shape is formed such that a first end r of the current supply cable 6, which is closest to a centre line of the spiral structure, is attached up to the trolley 3 while a second end R, which resides outermost from the centre line of the spiral structure, is attached to the hoisting member 5. A portion of the spiral settling and curling on top of plane surface A of the hoisting member 5 is supported by plane surface A of the hoisting member 5 as well as by an inner edge of the spiral that has settled earlier, with a slightly larger radius, on plane surface A, an outer edge of the portion of the spiral settling and curling being arranged to be supported against the inner edge.

The frame 6a of the current supply cable 6 (FIG. 3) is made of a material which by means of heating is formed into a flat spiral and which, after the heating, has a memory striving to return an unwound cable in to the shape of the flat spiral. For this purpose, a pneumatic hose, for instance, may preferably be used.

The necessary wiring, such as electric lines 7, may be drawn into a passage 6b of the frame 6a of the current supply cable 6 after its heating.

When using a pneumatic hose, the pneumatic hose is placed for instance in a mould machined out of aluminium and heated without any cables, such as electric lines 7, since they would not withstand a temperature of the order of about 150° C. The heating carried out in the mould leaves no recognizable mark in the pneumatic hose. In practice, the hose does not adopt a molten state but, through heating, "learns" the shape forced thereon by the mould.

The cavity 6*b* of the frame 6*a* of the current supply cable 6 is also provided with at least one data transfer cable 8 (for instance an Ethernet cable).

The height of the structure of the flat-spiral structure formed by the current supply cable 6 is in the order of about 10 to 50 mm while the lifting height of the hoisting device 1 (the path of the loading member) enabled by the down unwound current supply cable 6 is of the order of about 5 m.

Upon lowering the hoisting member 5 of the hoisting device 1, the spiral current supply cable 6 opens up in a downwards expanding circle, providing the necessary transfer chain for electricity and data transfer from the trolley 3 to the hoisting member 5.

Upon lifting the hoisting member 5, the current supply cable 6 becomes wound through its memory of shape into a flat-spiral structure on top of plane surface A of the hoisting member 5.

Another implementation of the current supply cable 6 assuming a spiral shape could be one wherein a spring made of spring steel and bent in to the shape of a spiral is used, installed inside a loose protecting tube together with necessary conductors. This implementation has not been separately shown in the drawings.

The above description of the invention is only intended to illustrate the basic idea of the invention. A person skilled in the art may thus vary its details within the scope of the attached claims. Thus, for instance, the use of the hoisting device according to the invention is not limited to the above-described implementation, but it may also be applied to other uses where the lifting height enables a current supply cable winding up in to the shape of a flat-spiral structure to be used.

The invention claimed is:

1. A hoisting device comprising:
    a trolley travelling along a support structure;
    a hoisting member to be lowered and lifted therefrom by hoisting ropes;
    a current supply cable between the trolley and the hoisting member,
    wherein the structure of the current supply cable is made to assume a spiral shape such that in an uplifted position the current supply cable forms an at least substantially flat-spiral structure wherein turns of the spiral structure lie in turns of increasing diameter, and wherein a frame of the current supply cable is made of a material which by heating is formed into a flat-spiral structure and which, after the heating, has a memory striving to return an unwound cable into the shape of the flat-spiral structure.

2. The hoisting device as claimed in claim 1, wherein all turns of the spiral structure are in substantially the same plane.

3. The hoisting device according to claim 1, wherein the turns of the spiral structure lie in a plurality of planes, the number of the planes being substantially smaller than the number of said turns.

4. The hoisting device according to claim 1, wherein a first end of the current supply cable, which is closest to a centre line of the spiral structure, is attached up to the trolley, while a second end of the current supply cable, which resides outermost from the centre line of the spiral structure, is attached to the hoisting member.

5. The hoisting device according to claim 1, wherein the frame of the current supply cable is made of a pneumatic hose.

6. The hoisting device according to claim 1, wherein necessary wiring is drawn into the frame of the current supply cable after its heating.

7. The hoisting device according to claim 6, wherein the necessary wiring is electric lines.

8. The hoisting device according to claim 1, wherein the current supply cable is provided with at least one data transfer cable.

9. The hoisting device according to claim 1, wherein in an uplifted position the current supply cable resides on a plane surface of the hoisting member, wound into the shape of a flat-spiral structure.

10. The hoisting device according to claim 1, wherein a height of the flat-spiral structure formed by the current supply cable is in the order of about 10 to 50 mm, while a lifting height of the hoisting device enabled by the down unwound current supply cable is of the order of about 5 m.

11. The hoisting device according to claim 1, wherein the hoisting device is a pick-up robot in an automatic warehouse.

* * * * *